United States Patent [19]
Wurzburger

[11] 3,802,457
[45] Apr. 9, 1974

[54] PLUG VALVE WITH COMBINED PLUG OPERATING, RETAINING, AND REMOVAL MEANS

[76] Inventor: Paul D. Wurzburger, 3255 E. Monmouth Rd., Cleveland Heights, Ohio 44118

[22] Filed: Dec. 4, 1972

[21] Appl. No.: 311,844

[52] U.S. Cl.................. 137/327, 251/292, 251/309, 251/286
[51] Int. Cl......................................... F16k 31/528
[58] Field of Search ............ 137/315, 327; 251/286, 251/287, 291, 292, 309, 310

[56] References Cited
UNITED STATES PATENTS
3,133,723  5/1964  Goldman et al................... 251/309
565,730  8/1896  Foote................................ 251/309

*Primary Examiner*—Alan Cohan
*Assistant Examiner*—David R. Matthews

[57] ABSTRACT

A rotary plug valve including a valve body having a bore with a lateral inlet port and a lateral outlet port communicating with the bore on opposite sides thereof. A plug is provided in the bore having a passage which communicates with the inlet and outlet ports in the open position of the valve. Sealing means are provided between the bore and the plug. Combined means are provided for operating the valve and for retaining the plug in the valve body. A portion of the combined means can be used to aid in removing the plug from the valve body and in reseating it therein.

6 Claims, 3 Drawing Figures

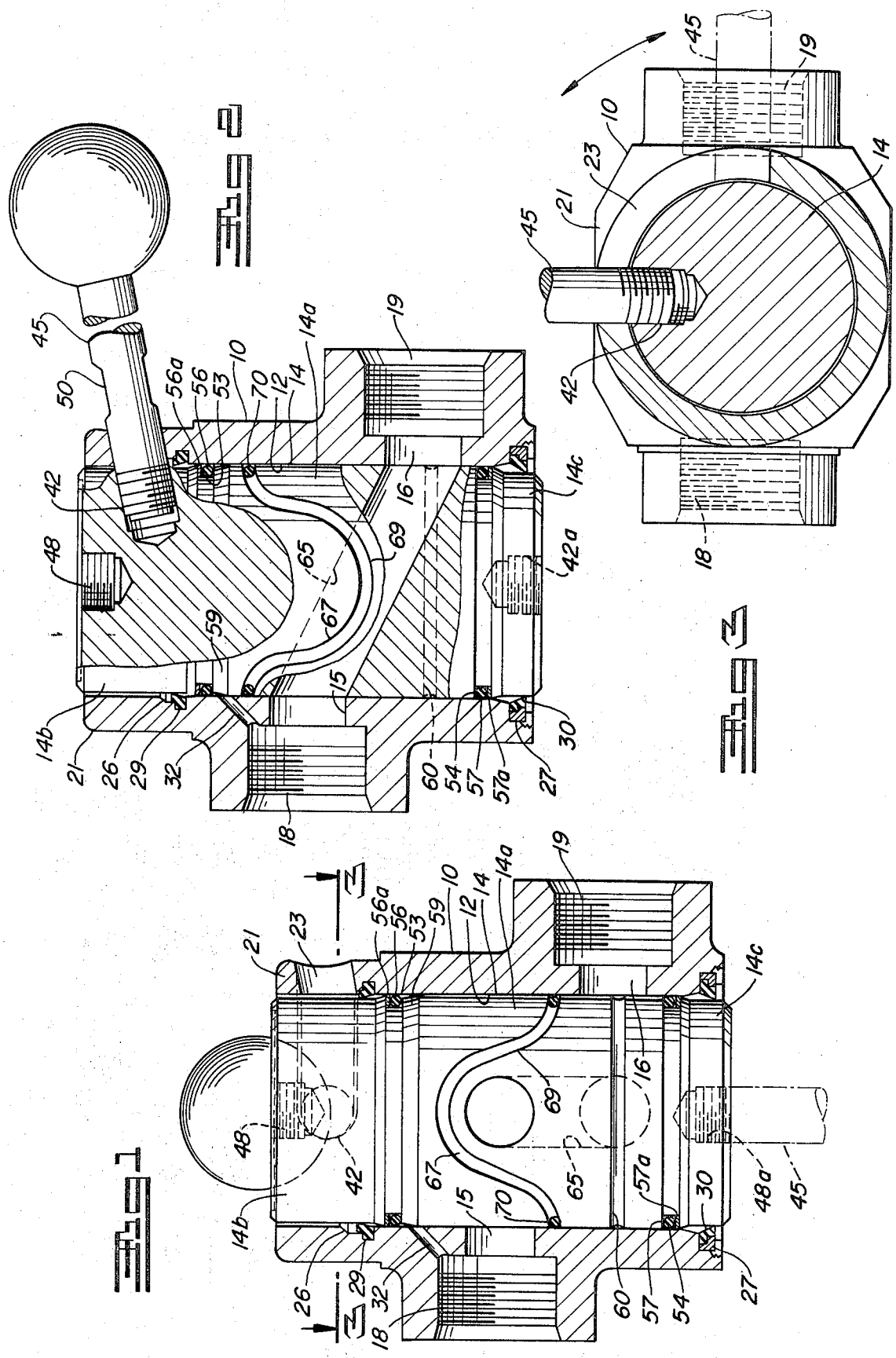

PLUG VALVE WITH COMBINED PLUG OPERATING, RETAINING, AND REMOVAL MEANS

BACKGROUND OF THE INVENTION

This invention relates to rotary plug valves and more particularly to such a valve having combined means for operating the valve, for preventing axial movement of the plug in the valve body and for aiding in removal of the plug from the valve body and in reseating it therein.

A typical rotary plug valve includes a valve body having a bore formed therein and inlet and outlet ports leading to and from the bore. A plug is arranged in the bore and some means is provided for rotating it between a closed position in which the inlet and outlet ports are sealed off from one another and an open position in which the ports are placed in communication through a passage or the like in the plug. The plug and the bore are generally either tapered or cylindrical. Sealing means may be provided to prevent leakage in the clearance between the plug and the bore from the inlet to the outlet port and to the outside of the valve.

The valve bodies of most plug valves are provided at one or both ends with means for retaining the plug in the bore. In some valves the plug must be retained in position only against forces tending to unseat it when it is operated plus, of course, its own weight. In other valves, particularly conical valves, the plug must be retained against hydraulic or pneumatic axial forces tending to unseat it. Such axial forces are created by fluid pressure acting upon the projected areas of the conical plug.

Despite the need for plug retaining means in a rotary plug valve the plug may still resist being seated or unseated in the valve body when the retaining means is not present such as in assembly or disassembly of the valve. It is, therefore, desirable to have a readily available means for assisting in seating and unseating the plug.

SUMMARY OF THE INVENTION

An object of this invention is to provide a rotary plug valve having a combined plug retaining and plug operating means.

Another object is to provide such a rotary plug valve in which the combined plug operating and retaining means is useful as an aid in assembling and disassembling the valve.

Still another object of this invention is to provide such a rotary plug valve in which the combined means is simple in construction and reliable and effective in use.

A preferred embodiment of rotary plug valve according to the present invention includes a valve body having a bore with a lateral inlet port and a lateral outlet port communicating with the bore on opposite sides thereof. A plug is provided in the bore and has a passage which communicates with the inlet and outlet ports in the open position of the valve. Combined plug operating and retaining means is provided for rotating the plug about its axis within predetermined limits to open or close the valve and for retaining the plug against axial movement with respect to the bore.

Preferably, the plug operating and retaining means includes a guide slot in the periphery of the valve body lying substantially normal to the axis of the bore. A threaded hole is provided in the plug aligned with the guide slot and a plug operating handle extends through the guide slot into threaded engagement in the hole. The operating handle is adapted to rotate the plug about its axis within the limits defined by the guide slot and contact of the handle with the edges of the guide slot prevents axial movement of the plug.

According to another aspect of the invention, the valve body is open at one or both ends and a tapped hole is provided in one or both ends of the plug adapted to receive the operating handle in threaded engagement therewith to enable the operating handle to be used to seat the plug in the bore or to remove it therefrom.

BRIEF DESCRIPTION OF THE DRAWINGS

FIG. 1 is a side elevational view, partly in section, of a valve embodying the present invention, the valve being shown in the closed position.

FIG. 2 is a view similar to FIG. 1 with the valve shown in the open position.

FIG. 3 is a horizontal sectional view of the valve on the line 3—3 of FIG. 1.

DESCRIPTION OF THE PREFERRED EMBODIMENT

Referring now to the drawing, a preferred form of valve according to the present invention includes a valve body 10 having an axially extending cylindrical bore 12 open at both ends. A plug 14 is seated in the bore. A lateral inlet port 15 and a lateral outlet port 16 communicate with the bore 12 on opposite sides thereof. Ports 15, 16 are axially offset for reasons that will appear below. Ports 15, 16 communicate at their ends opposite bore 12 with inlet and outlet connections in the form of threaded sockets 18, 19. The top part of valve body 10 is cylindrical and has an arcuate slot 23 in its outer wall. Slot 23 extends through substantially 90° and defines an operating path and guideway for a plug operating handle. The plug operating handle also serves as a plug retaining and removing means as will be described below. Recesses 26, 27 are provided in the wall of bore 12 adjacent its top and bottom ends and conventional wiper rings 29, 30 are seated therein to bear resiliently against the periphery of plug 14 and prevent contaminants such as dirt and the like from entering the valve. A passage 32 is provided in the valve body between the inlet socket 18 and bore 12 which serves a purpose described below.

Plug 14 has an axially central sealing portion 14a which has a close fit with bore 12 and has an upper portion 14b and a lower portion 14c which are reduced very slightly in diameter from sealing portion 14a. The upper portion 14b of the plug also has a tapped hole 42 in its cylindrical surface inclined upwardly at a slight angle toward the periphery of the plug as shown in FIG. 2. A combined plug operating handle, plug retaining means and plug removing means 45 extends through slot 23 in the cylindrical portion 21 of the valve body and into threaded engagement in hole 42. Operating handle 45 can be rotated through the limits defined by slot 23 to rotate plug 14 from one to the other of the open and closed positions of the valve. In the open position of the valve handle 45 is aligned with inlet openings 18 and 19 and in the closed position of the valve extends substantially perpendicular thereto. The arcuate slot 23 determines the limits of both rotary and axial movement of operating handle 45. The height of slot 23 is substantially equal to the diameter of handle 45 so that essentially no axial movement of the handle, or of plug 14, is possible. The arcuate length of slot 23 determines the permitted amount of rotation of handle 45. The ends of the slot act as abutments for limiting rotation of handle 45 and, therefore, of plug 14.

According to an aspect of the present invention, the upper portion 14b and the lower portion 14c of the plug are provided with axially extending tapped holes 48, 48a, respectively. The threads of holes 48, 48a and those of operating handle 45 are matched so that the operating handle can be threaded into either hole to assist in either unseating and removing the plug 14 from the bore or in seating it therein. To assist in threading handle 45 into tapped hole 42 or in removing it therefrom there are provided flats 50 in the operating handle to which a wrench can be applied for tightening the threads of the handle snugly into hole 42 and for initial loosening of the threads.

The limits of the sealing portion 14a of plug 14 are defined by annular grooves 53, 54 in the plug in which are seated O-ring seals 56 and 57 and conventional back-up rings 56a and 57a. These O-rings provide a seal between the plug and the bore to prevent leakage of fluid from either open end of the valve. Located axially inwardly of the respective end O-rings 56 and 57 are pressure distributing grooves 59, 60 which ensure that controlled fluid and its pressure are distributed completely about the periphery of plug 14. Normally, there will be sufficient clearance between plug 14 and bore 12 to permit fluid to distribute itself in the clearance. Grooves 59 and 60, however, facilitate and add to such distribution. The passage 32 between inlet socket 18 and bore 12 opens in the bore in substantial alignment with distributing groove 59 to permit the passage of fluid directly thereto. From the groove the fluid can flow axially downwardly in the clearances between plug and bore. The lower distributing groove 60 is positioned to intersect lateral outlet port 16 and no passage is necessary to ensure that fluid is provided to the groove.

A slanted passage 65 extends through the sealing portion 14a of the plug with its central axis intersecting the longitudinal axis of plug 14. The upper end of passage 65 is at the same axial height as inlet port 15 and the lower end of passage 65 is at the same axial height as outlet port 16. In the open position of the valve shown in FIG. 2 passage 65 connects inlet port 15 with outlet port 16. In the closed position of the valve passage 65 is substantially at right angles to inlet port 15 and outlet port 16.

Flow sealing means generally indicated at 67 is provided between plug 14 and bore 12 to prevent leakage of fluid between the inlet and outlet ports in the closed position of the valve. Flow sealing means 67 follows a cyclical path having peaks that extend alternately above and below one of the ports 15, 16, preferably inlet port 15. Corresponding increments of different cycles of the path lie diametrically opposite each other. As a result, the path defines equal areas between itself and each of the end sealing O-rings 56, 57 at diametrically opposite portions of the plug surface. The areas on the upstream and downstream sides of the plug that can be acted upon by fluid pressure are thus equalized and the forces acting on the plug will be balanced. The path of the flow sealing means in the closed position of the valve is between the inlet port and the outlet port to prevent leakage therebetween.

The flow sealing means is carried by the plug 14 in the form of a sinuous annular groove 69 which completes two full repetitive cycles about the periphery of the plug, and an O-ring 70 seated in the groove. The flow sealing means and its operation and effect are described fully in my copending application Ser. No. 311,846 filed concurrently with this application and entitled "Pressure-Balanced Plug Valve".

It will be noted that valve body 10 is open at both ends and that the plug 14 extends outwardly a slight distance from each end. No cap, plug or similar means is provided at either end of the valve body to support and retain the plug therein. In place of an end cap or the like the plug in the present invention is retained in position in the bore by operating handle 45. When the plug is stationary in either the open or closed position the only axial force acting upon it is its own weight since it is cylindrical. In this case friction such as provided by the O-rings and wiper rings is usually sufficient to retain it in the valve body. When the plug is operated, however, retaining means are required to prevent unseating of the plug by axial forces applied to it as it is rotated. According to the present invention because there is essentially no axial clearance between operating handle 45 and slot 23 any axial force generated in rotating the plug is transmitted to and absorbed by the edge of slot 23 and is not transmitted to plug 14. As shown in the drawing, the operating handle is free to be rotated in a radial plane within the limits defined by the guide slot 23 but has essentially no freedom of movement axially of the valve body. The plug is thus retained in position in the valve body by the operating handle and its contact with the edges of slot 23.

In the case of a tapered plug and bore, the plug tends to be unseated by fluid pressure acting upon the projected area of the plug. Operating handle 45 is preferred for use as a retaining means only for cylindrical plugs and those of very small taper in which the axial force tending to unseat the plug is not too great.

According to another aspect of this invention operating handle 45 serves not only as an operating handle and plug retaining means but also, in cooperation with tapped holes 48, 48a in the end surfaces of the plug, as a plug insertion and removal means. If it is desired to disassemble the valve or remove the plug from the valve body for any reason such as to replace or inspect an O-ring or wiper ring it is first necessary to remove operating handle 45 from its threaded engagement with tapped hole 42 in the plug. Because of friction between the O-rings and the wall of the bore the plug may not only be held in the bore but may resist being removed therefrom. Operating handle 45 may be threaded into tapped hole 48 or 48a as shown in dashed lines in FIG. 1 and employed to either push or pull the plug 14 out of the valve body. The operating handle is particularly helpful when the plug has been partially removed from the bore. In this position, without a removal aid such as operating handle 45 it is difficult to grip the extended portion of the plug to pull it out or to exert pressure on the end of the plug within the bore to push it in.

The operating handle in threaded engagement in tapped hole 48 or 48a also provides a convenient tool for insertion of the plug into the valve body. It is particularly useful for the last increments of adjustment to align the ends of the slanted passage 65 in the plug with the inlet and outlet ports 15 and 16.

While a preferred form of the present invention has been specifically disclosed herein it will be apparent to those skilled in the art that modifications and improvements may be made to the form herein specifically disclosed without departing from the spirit and scope of the present invention. In particular, it will be apparent that the principles of the combined plug operating means, retaining means and removal means may be employed with plug valves other than as specifically disclosed herein. Accordingly, this invention is not to be limited to the form herein specifically disclosed nor in any other way inconsistent with the progress in the art promoted by the invention.

What is claimed is:

1. A rotary plug valve comprising a valve body having a bore with a lateral inlet port and a lateral outlet port communicating with said bore on opposite sides thereof, a plug in said bore having a passage which communicates with said inlet and outlet ports in the open position of the valve, and means for rotating said plug about its axis within predetermined limits and for retaining said plug against axial movement with respect to said bore, said plug operating and retaining means including a guide slot in the periphery of said valve body lying substantially normal to the axis of said bore, a threaded hole in said plug aligned with said guide slot, and a plug operating handle extending through said guide slot into threaded engagement with said hole, said operating handle being adapted to rotate said plug about its axis within the limits defined by said guide slot and being in contact with the edges of said guide slot to prevent axial movement of said plug.

2. A valve according to claim 1 wherein opposite ends of said guide slot lie substantially in mutually perpendicular axial planes, one of said planes containing said inlet and outlet ports.

3. A valve according to claim 1 wherein the height of said guide slot is substantially equal to the diameter of said operating handle.

4. A valve according to claim 1 including a flat portion on said operating handle for use in tightening said operating handle snugly into said threaded hole and loosening it therefrom.

5. A rotary valve having an axis, a substantially cylindrical axial bore, a congruent plug having a transverse passage and fitted with axial and circumferential clearance areas for rotary movement about said axis in said bore, said valve having inlet and outlet ports communicable with said passage in valve-open position and incommunicable therewith in closed position, annular seals closing the ends of said clearance area and also dividing the same between inlet port and outlet port pressure areas, means tending to balance fluid pressure in said areas diametrically and axially, and means for rotating and retaining said plug in said bore comprising a circumferential slot in said bore disposed axially beyond one of said end-closing seals and a radially extending rod secured to said plug and passing through said slot with sliding axial clearance, said slot having circumferential length corresponding to circumferential movement of said plug from open to closed position.

6. A rotary plug valve comprising a valve body having a bore with a lateral inlet port and a lateral outlet port communicating with said bore on opposite sides thereof, a plug in said bore having a passage which communicates with said inlet and outlet ports in the open position of the valve, means for rotating said plug about its axis within predetermined limits and for retaining said plug against axial movement with respect to said bore, said plug rotating and retaining means including an operating handle, and a threaded hole in one end of said plug adapted to receive said operating handle in threaded engagement therewith, whereby said operating handle may be used to seat said plug in said bore or to remove it therefrom.

* * * * *